(12) United States Patent
Lambert et al.

(10) Patent No.: US 6,614,458 B1
(45) Date of Patent: Sep. 2, 2003

(54) METHOD AND APPARATUS FOR DISPLAYING AND MANIPULATING MULTIPLE GEOMETRIC CONSTRAINTS OF A MECHANICAL DESIGN

(75) Inventors: Mark Lambert, Lake Oswego, OR (US); Paul Hanau, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/495,031

(22) Filed: Jan. 31, 2000

(51) Int. Cl.[7] .............................. G06F 3/00; G06F 3/14; G06F 17/50
(52) U.S. Cl. .................. 345/856; 345/619; 345/642; 345/862; 345/964; 700/97; 700/103
(58) Field of Search ................. 345/619, 642, 345/651, 652, 662, 663, 676–678, 764, 769, 788, 802, 809, 835, 846, 856, 859, 860, 861, 862, 964; 700/96, 97, 103, 83–85, 56–58, 98, 122, 131, 135, 180–182, 184, 185

(56) References Cited

U.S. PATENT DOCUMENTS

| | | | | |
|---|---|---|---|---|
| 4,813,013 A | * | 3/1989 | Dunn | 345/618 |
| 5,040,131 A | * | 8/1991 | Torres | 345/810 |
| 5,251,290 A | * | 10/1993 | Pabon | 345/418 |
| 5,390,294 A | * | 2/1995 | Takeuchi | 345/440 |
| 5,452,238 A | * | 9/1995 | Kramer et al. | 345/419 |
| 5,572,639 A | * | 11/1996 | Gantt | 345/651 |
| 6,219,049 B1 | * | 4/2001 | Zuffante et al. | 345/420 |
| 6,426,745 B1 | * | 7/2002 | Isaacs et al. | 345/419 |

* cited by examiner

Primary Examiner—John W. Cabeca
Assistant Examiner—X. L. Bautista
(74) Attorney, Agent, or Firm—Schwabe, Williamson & Wyatt, PC

(57) ABSTRACT

Computer instructions that operate to view a display of geometric constraints associated with a selected piece of geometry of a mechanical design and to drag and manipulate multiple geometric constraints of multiple pieces of geometry associated with the selected piece of geometry, when executed, is disclosed. In one embodiment, the computer instructions are part of a mechanical design software application. In one embodiment, the mechanical software application including the computer instructions are embodied in a distribution storage medium.

21 Claims, 13 Drawing Sheets

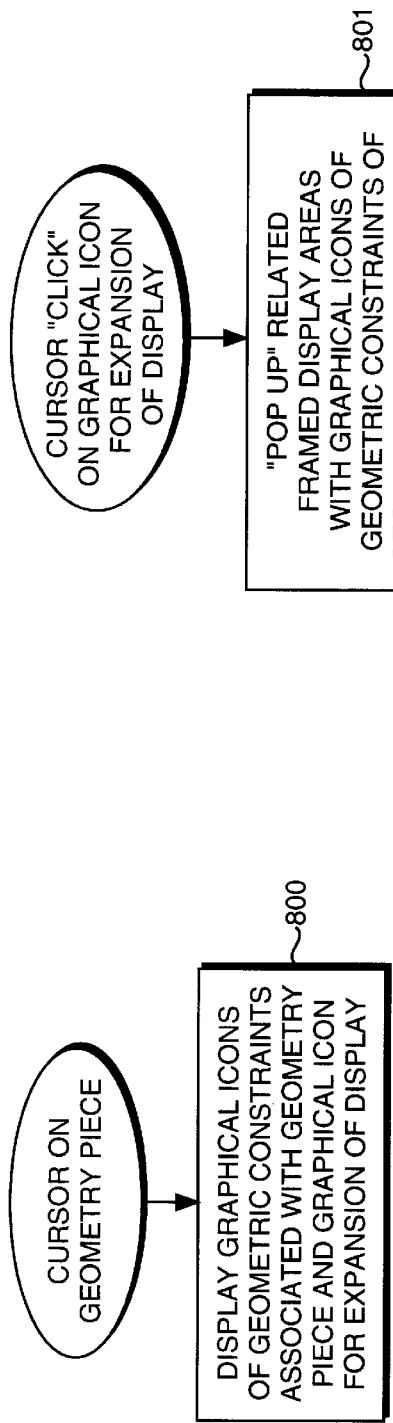
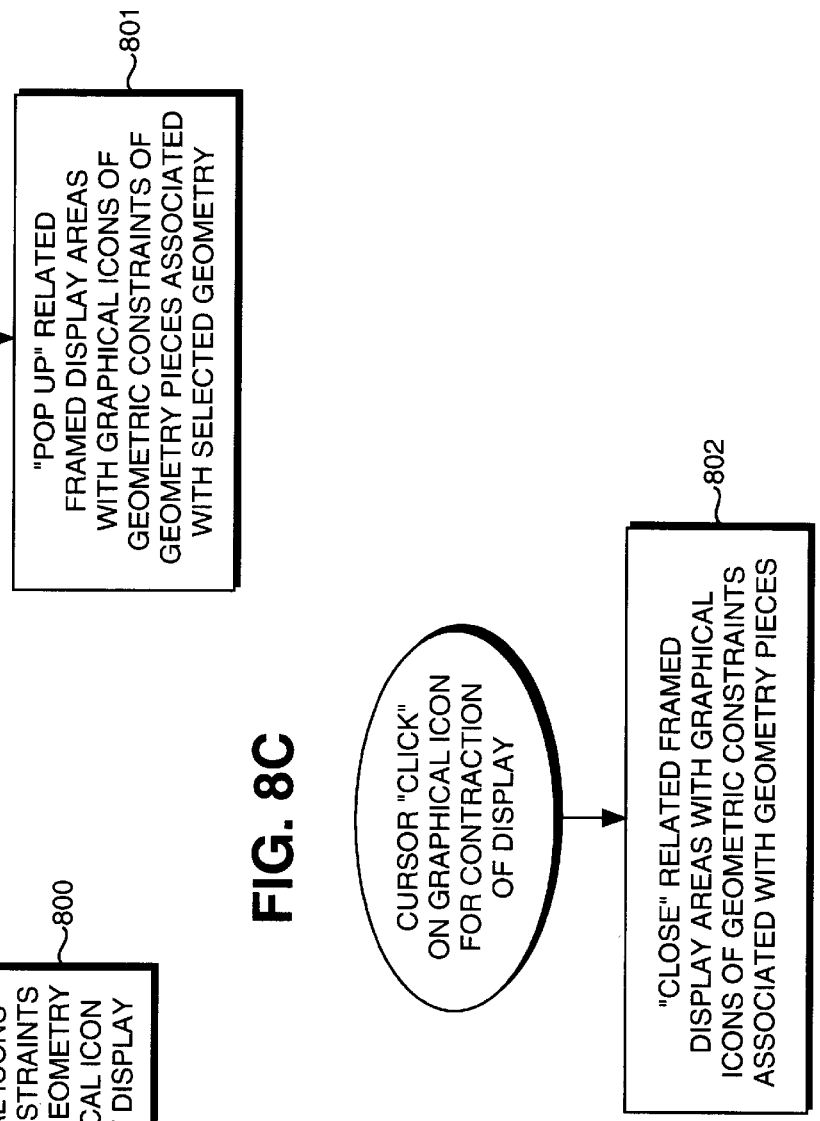
FIG. 8A
FIG. 8B
FIG. 8C

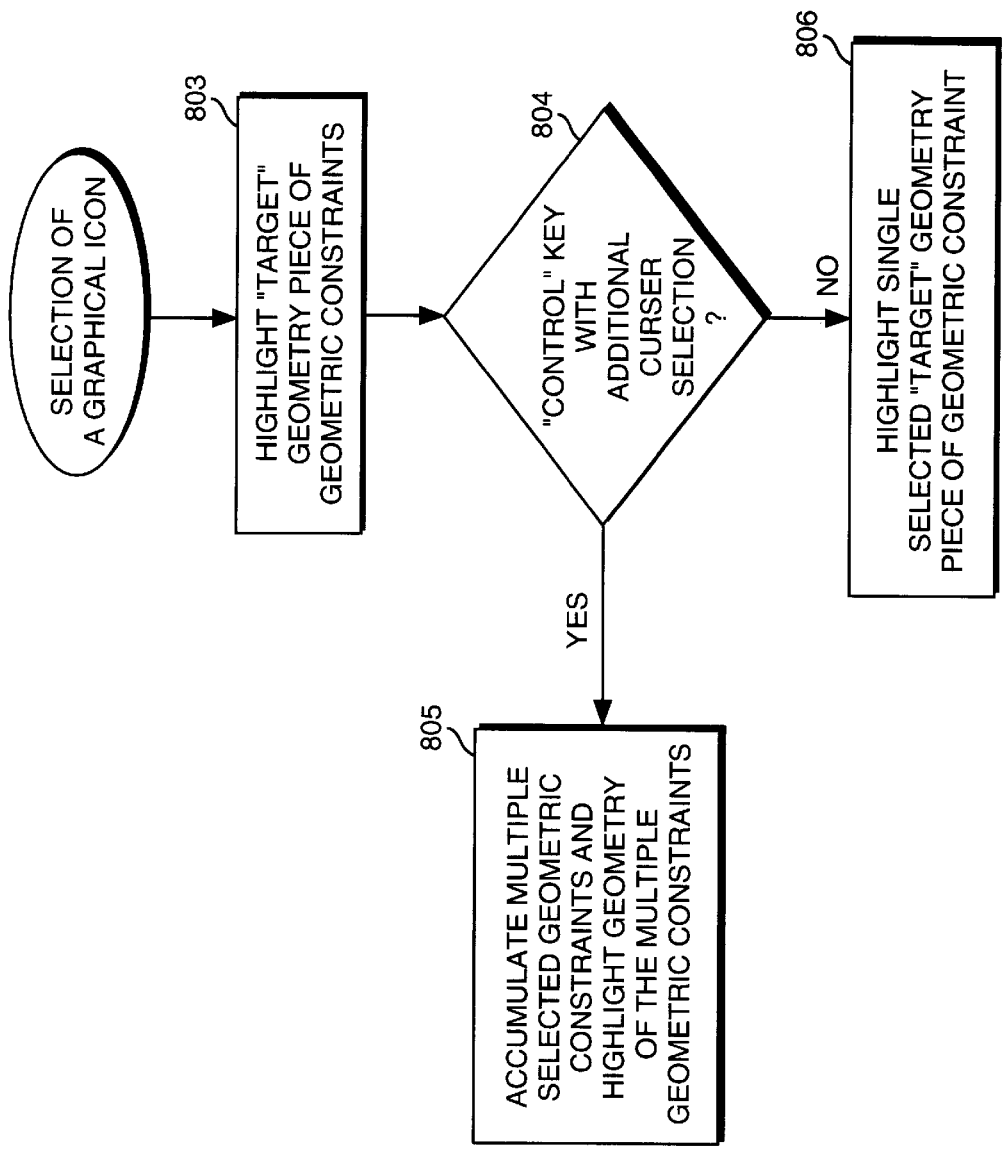

METHOD AND APPARATUS FOR DISPLAYING AND MANIPULATING MULTIPLE GEOMETRIC CONSTRAINTS OF A MECHANICAL DESIGN

RELATED APPLICATION

This application is a continuation-in-part of application Ser. No. 09/076,567, filed May 12, 1998.

FIELD OF INVENTION

The present invention relates to the field of computer aided design (CAD). More specifically, the present invention relates to computer assistance to a designer working with geometric constraints of a mechanical design.

BACKGROUND OF THE INVENTION

Most mechanical designs require a designer to manipulate geometric constraints between different geometry pieces of a mechanical design. An example of a geometric constraint is a vertical or horizontal orientation to be maintained for a line. Another example is a perpendicular relationship to be maintained between two lines. Yet another example is a tangential relationship to be maintained between a line and an arc. For the purpose of this application, a line, an arc, etc. of a mechanical design shall be generically referred to as geometry pieces of the mechanical design.

Generally, only limited support are provided by conventional mechanical design software on geometric constraint manipulation by a designer. Typically, the support is limited to the simultaneous display of all geometric constraints of all geometric pieces of a mechanical design at the same time. Thus, even when the geometric constraints are represented by graphical icons and "minimized", the display still tends to be cluttered and not very user friendly. Moreover, there is no easy way for the designer to delete or retarget a geometric constraint, without inputting a sequence of commands, which often requires a large number of key strokes. Thus, a more user friendly approach for manipulating geometric constraints is desired. As will be described in more details below, the present invention achieves these and other desirable objectives, which will be apparent from the disclosure to follow.

SUMMARY OF THE INVENTION

Computer instructions that operate to view a display of geometric constraints associated with a selected piece of geometry of a mechanical design and to drag and manipulate multiple geometric constraints of multiple pieces of geometry associated with the selected piece of geometry, when executed, is disclosed. In one embodiment, the computer instructions are part of a mechanical design software application. In one embodiment, the mechanical software application including the computer instructions are embodied in a distribution storage medium.

BRIEF DESCRIPTION OF DRAWINGS

The present invention will be described by way of exemplary embodiments, but not limitations, illustrated in the accompanying drawings in which like references denote similar elements, and in which:

FIGS. 8a–8e illustrate the relevant operational flows of one embodiment of geometric constraint manager 108 of FIG. 1.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
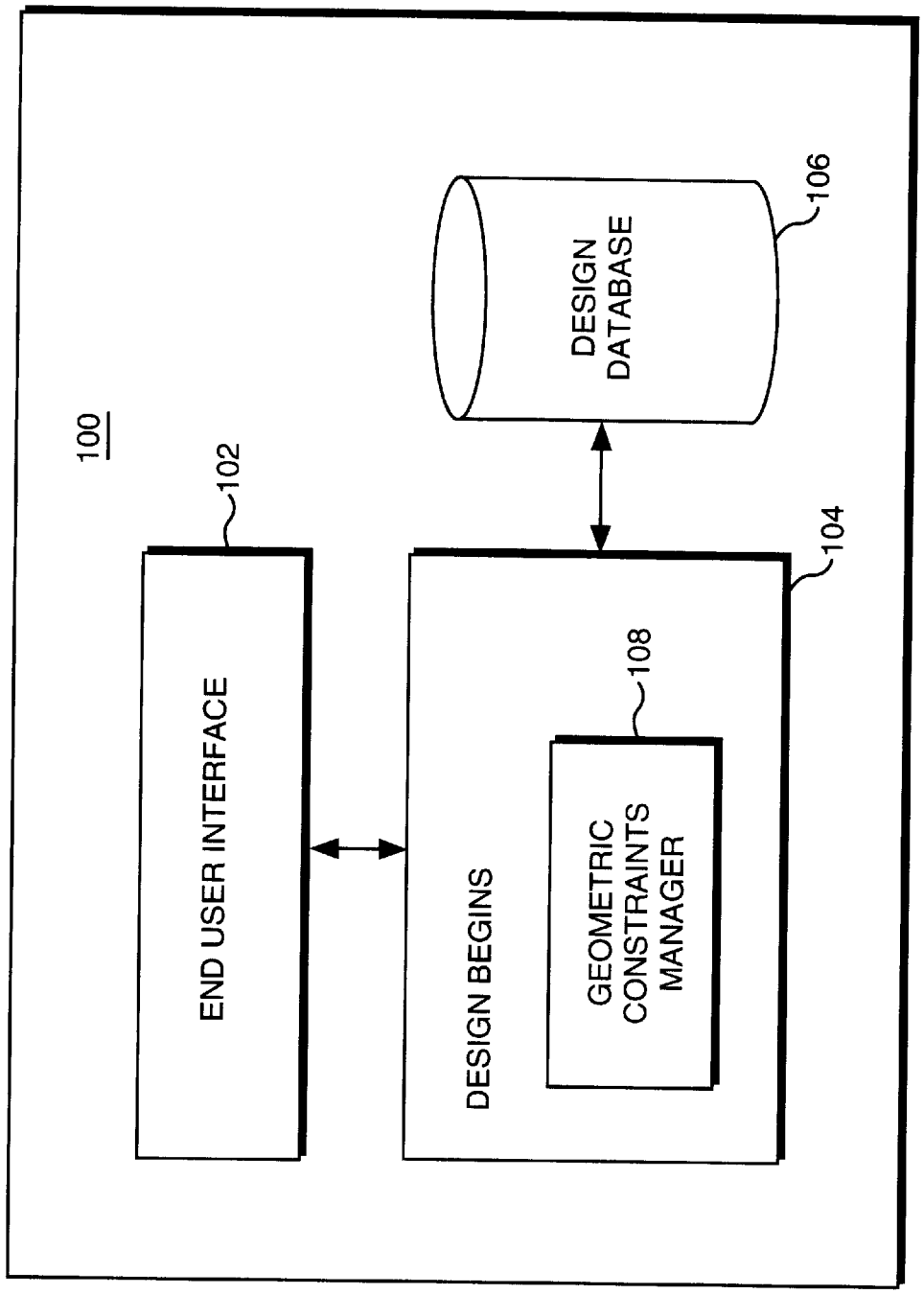
FIG. 1 illustrates one embodiment of a mechanical design software application incorporated with the teachings of the present invention.

Refer now to FIG. 1, wherein a block diagram illustrating one embodiment of a mechanical design application is shown. As illustrated, mechanical design application 100 includes end user interface 102, design engine 104 and design database 106. Design engine 104 includes in particular geometric constraint manager 108 incorporated with the teachings of the present invention. Together, the elements cooperate to facilitate designing of mechanical designs by a designer. More specifically, end user interface 102 operates to facilitate input by the designer and display of mechanical designs for the designer, under the control of design engine 104. Design database 106 facilitates storage of mechanical designs created by the designer, also under the control of design engine 104. In particular, geometric constraint manager 108 automatically facilitates manipulation of geometric constraints associated with geometry pieces of mechanical designs by the designer. In accordance with the present invention, the automated facilitation are provided responsive to the location of a cursor, relative to the different geometry pieces of a displaced mechanical design, to be described more fully below. Except for the teachings of the present invention incorporated in geometric constraint manager 108, mechanical design application 100 is intended to represent a broad range of mechanical design software known in the art, including but not limited to Mechanical Desktop®, available from Autodesk, Inc. of San Rafael, Calif.

Figure 2A:
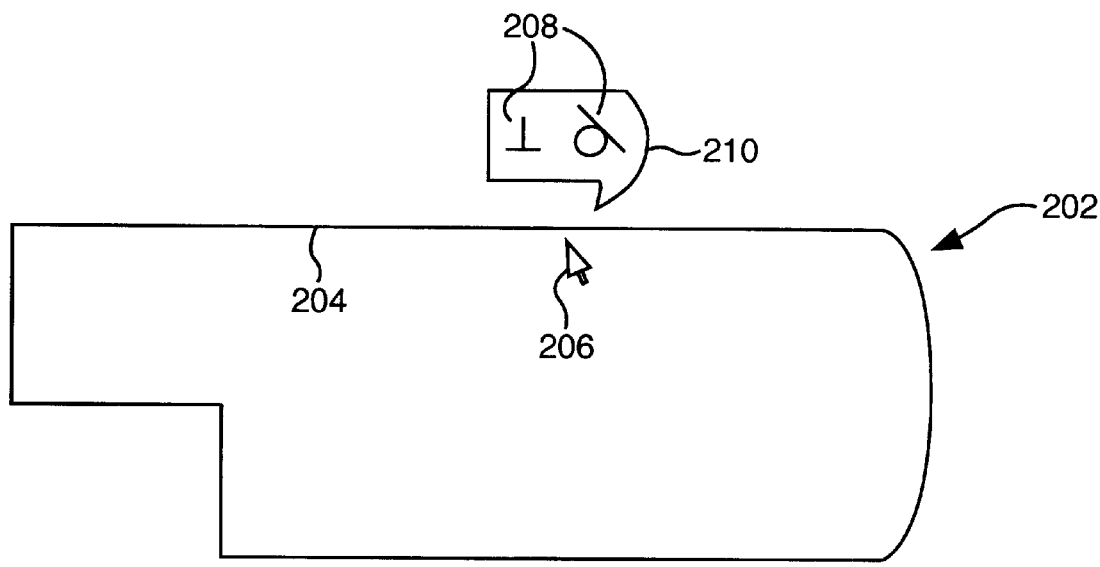
FIGS. 2a–2b illustrate a first aspect of the present invention providing selective viewing of geometric constraints to a designer.
Figure 2B:
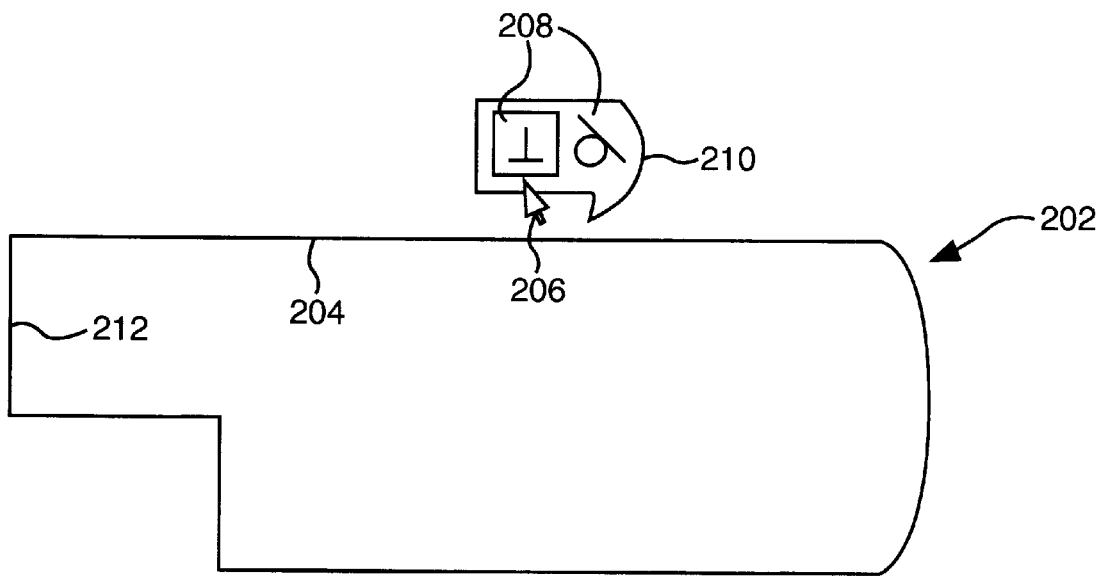

FIGS. 2a–2b illustrate a first aspect of the present invention, the facilitation of viewing of geometric constraints of a displayed mechanical design by a designer. As shown in FIG. 2a, geometric constraint manager 108 operates to automatically cause graphical icons 208 representing geometric constraints associated with geometry piece 204 of mechanical design 202 to be displayed, when cursor 206 is located within a predetermined proximity of geometry piece 204. The size of the predetermined proximity is application dependent, and may be any amount depending on the desired sensitivity. Preferably, it is customizable by the designer. For the illustrated embodiment, graphical icons 208 are caused to be displayed within framed area 210. The framed display is removed when the designer moves the cursor outside the predetermined proximity of the geometry piece. In other words, the designer is automatically notified of the geometric constraints associated with a geometry piece as soon as the designer moves the cursor within the predetermined proximity, without requiring the designer to select the geometry piece or otherwise issue a command, e.g. from selecting a command in a drop down or pop up menu, and the display disappears as the designer moves the cursor away from the geometry piece. Thus, the designer may selectively view the geometric constraints of the different geometry pieces of the mechanical design by moving the cursor around. As will the appreciated by those skilled in the art, the display is much less cluttered and more readily available than the prior art, resulting in substantial improvement in usability.

Additionally, for the illustrated embodiment, as shown by FIG. 2b, geometric constraint manager 108 causes the "target" geometry piece of the geometric constraint, i.e. the geometry piece to which geometry piece 204 is geometrically constrained, e.g. geometry piece 212, to be highlighted, when the designer selects one of the graphical icons 208. In FIG. 2b, geometry pieces 204 and 212 are constrained to be perpendicular to each other, as represented by the perpendicular graphical icon 208. Geometry piece 212 is highlighted when the designer selects the perpendicular graphical icon 208. For the purpose of this application, selection of a graphical icon includes placement of the cursor within a predetermined proximity of the graphical icon, as well as "clicking" on a graphical icon. Furthermore, for unitary constraints, such as maintaining a vertical/horizontal orientation, the geometry piece itself is considered the "target" geometry piece. Thus, when a user selects a graphical icon representing one of these unitary constraints, change in the display is unnecessary, as the object or "target" of the unitary constraint, i.e. the geometry piece itself is already highlighted. Thus, under the present invention, a designer is not only able to easily and selectively view the geometric constraints associated with the various geometry pieces. The designer is also able to easily and selectively view the "target" geometry piece of each of the geometric constraints.

Figure 3A:
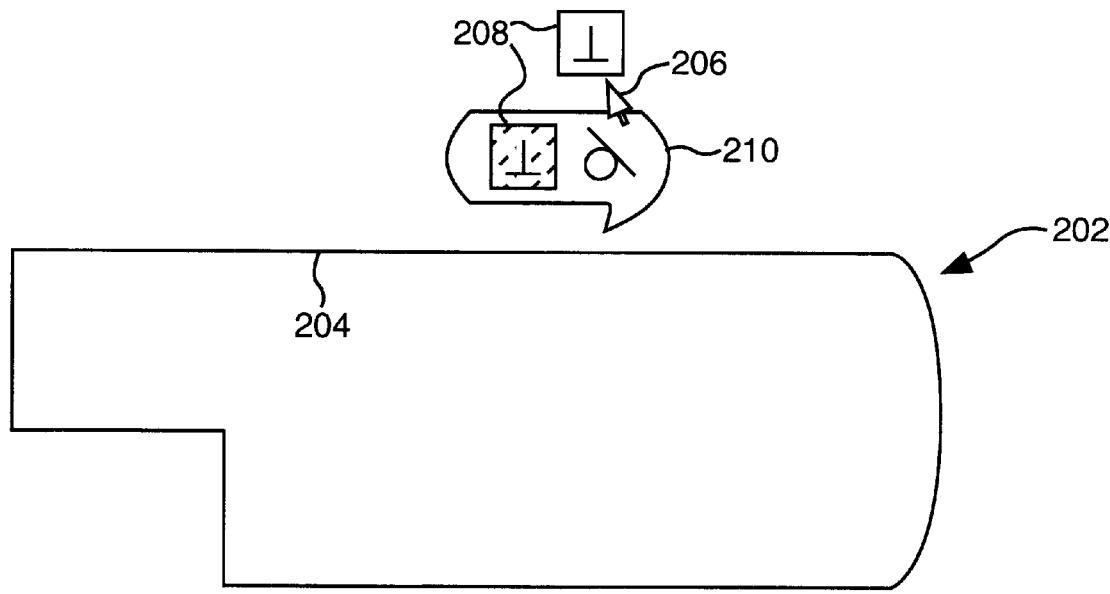
FIGS. 3a–3b illustrate a second aspect of the present invention facilitating removal of geometric constraints by a designer.
Figure 3B:
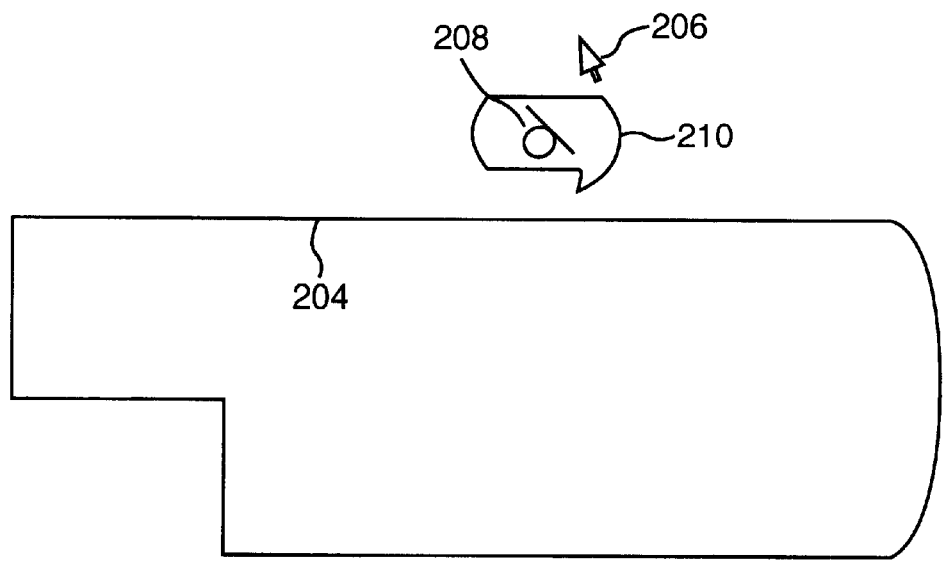

FIGS. 3a–3b illustrate a second aspect of the present invention, the facilitation of removal of geometric constraints of a displayed mechanical design by a designer. As shown by the figures, geometric constraint manager 108 operates to automatically remove a geometric constraint, whenever the user drags and drops the graphical icon 208 representing the geometric constraint in an empty display area. For the illustrated example, once the designer drags and drops the perpendicular graphical icon representing the perpendicular constraint between geometry pieces 204 and 212 in the empty display area, the information denoting the perpendicular constraint is removed from the design database, and the graphical icons displayed are refreshed to reflect the fact that the geometric constraint has been removed. FIG. 3b illustrates the moment immediately after the dragging and dropping of the perpendicular graphical icon 208 into an empty display area. The perpendicular graphical icon is removed from the framed display, leaving only the tangent graphical icon, denoting geometry piece 204 as merely having only one geometric constraint, i.e. the tangent constraint. As will be appreciated by those skilled in the art also, the above described approach for removing geometric constraints also represents significant improvement over the prior art in terms of the number of key strokes and amount of cursor movement otherwise would have been required to effectuate the same result. In alternate embodiments, other types of depository areas may be employed, e.g. a "trash bin" area.

Figure 4A:
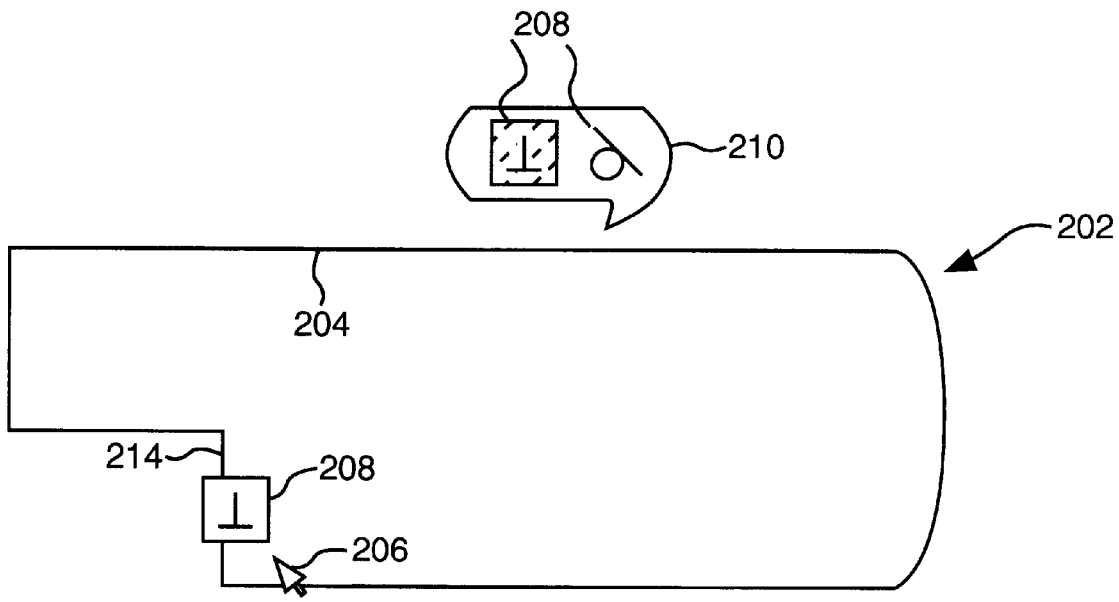
FIGS. 4a–4b illustrate a third aspect of the present invention facilitating re-targeting of geometric constraints by a designer.
Figure 4B:
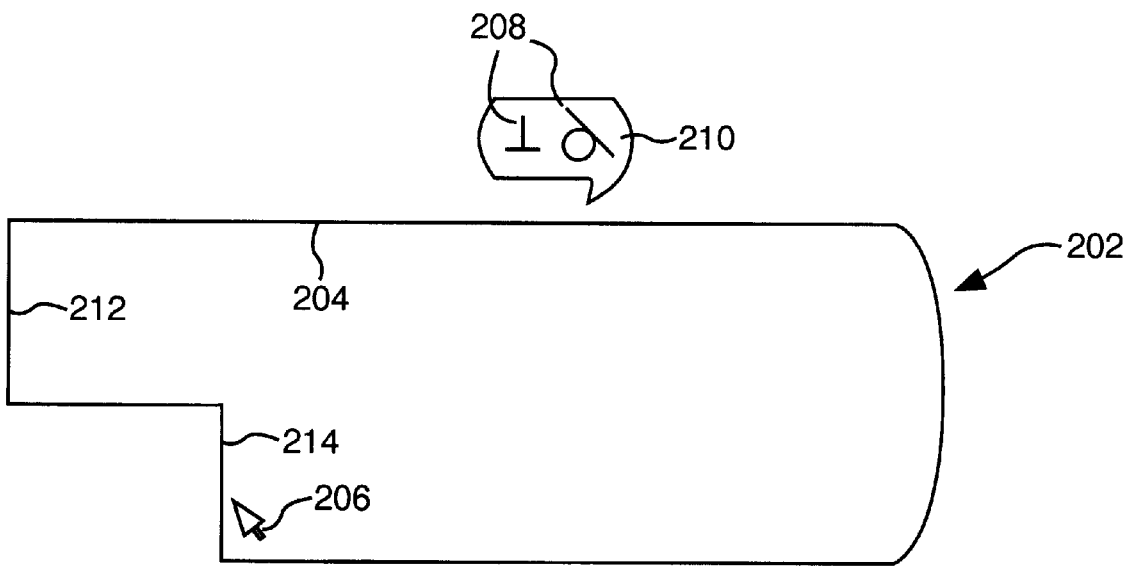

FIGS. 4a–4b illustrate a third aspect of the present invention, the facilitation of re-targeting of geometric constraints of a displayed mechanical design by a designer. As shown by the figures, geometric constraint manager 108 operates to automatically re-target a geometric constraint, whenever the user drags and drops the graphical icon 208 representing the geometric constraint to a different geometric piece, e.g. geometric piece 214. For the illustrated example, once the designer drags and drops the perpendicular graphical icon representing the perpendicular constraint between geometry pieces 204 and 212 over geometry piece 214, the information denoting the perpendicular constraint in the design database is updated to reflect geometric piece 214 as the new "target" geometry piece. That is, geometry pieces 204 and 214 are constrained to be perpendicular to each other, as opposed to geometry pieces 204 and 212. Note that, for the illustrated embodiment, refresh of the graphical icons displayed is not necessary. FIG. 4b illustrates the moment immediately after the design dragging and dropping the perpendicular graphical icon 208 over geometry piece 214. The changes occur internally on the system, and the display remain substantially unchanged. The operation applies similarly to unitary constraints. When an icon representing an unitary constraint is dragged and dropped on a "new" geometry piece, the design database is updated to reflect that the unitary constraint will be imposed on the "new" geometry piece instead. As will be appreciated by those skilled in the art also, the above described approach for re-targeting geometric constraints also represents significant improvement over the prior art in terms of the number of key strokes and amount of cursor movement otherwise would have been required to effectuate the same result.

Figure 5C:
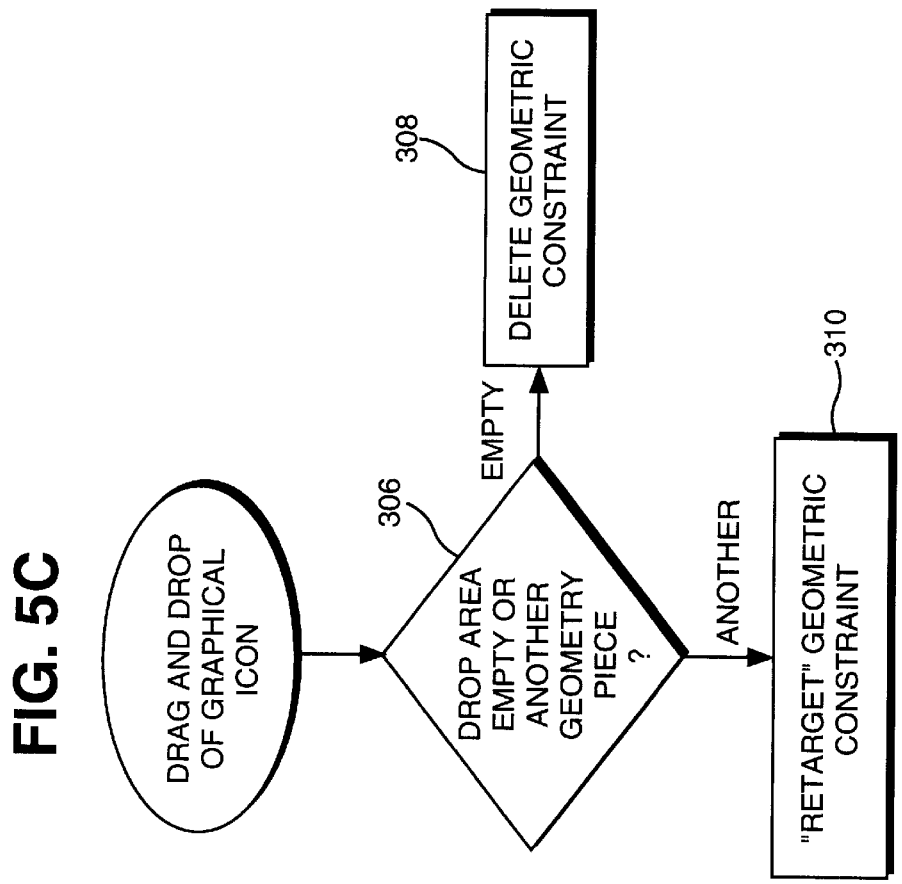
FIGS. 5a–5c illustrate one embodiment of the relevant operational flows of the geometric constraint manager of FIG. 1.
Figure 5A:
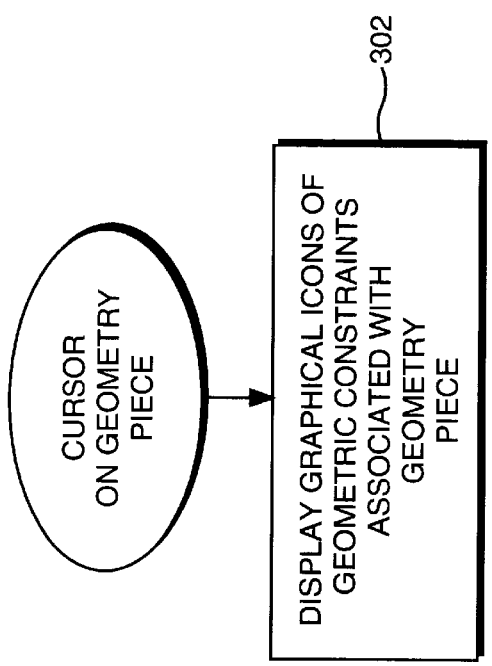
Figure 5B:
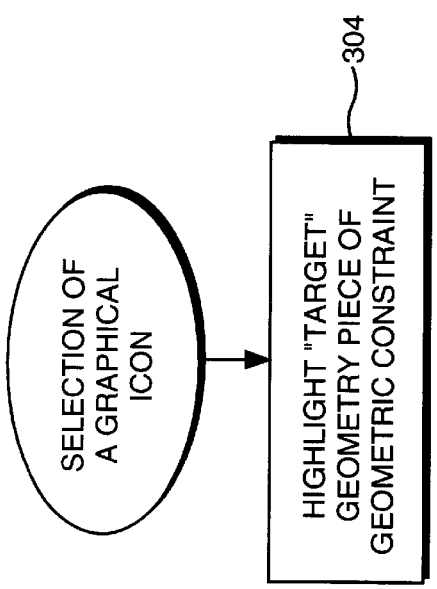

FIGS. 5a–5c illustrate the relevant operational flows of one embodiment of geometric constraint manager 108 of FIG. 1. For the illustrated embodiment, geometric constraint manager 108 is programmed in an event driven model, i.e. geometric constraint manager 108 is designed to be executed in a system environment where various event notification services are available from the operating system. One example of such operating system suitable for practicing the present invention is the Windows® operating systems, available from Microsoft Corporation, of Redmond, Wash. In alternate embodiments, geometric constraint manager 108 may be implemented in other programming approaches known in the art.

As shown in FIG. 5a, responsive to an event notification informing geometric constraint manager 108 of the fact that the user has moved the cursor within the predetermined proximity of a geometry piece of the displayed mechanical design, geometric constraint manager 108 causes other functional blocks of design engine 104 to display the graphical icons representative of the geometric constraints associated with the geometry piece, step 302. The manner in which the other functional blocks effectuate the display is application dependent, and may be implemented in any one of a number of manners known in the art.

As shown in FIG. 5b, responsive to an event notification informing geometric constraint manager 108 of the fact that the user has selected one of the displayed graphical icons, geometric constraint manager 108 causes other functional blocks of design engine 104 to highlight the "target" geometry piece of the geometric constraint represented by the selected graphical icon, step 304. Similarly, the manner in which the other functional blocks effectuate the highlight is application dependent, and may be implemented also in any one of a number of manners known in the art.

As shown in FIG. 5c, responsive to an event notification informing geometric constraint manager 108 of the fact that the user has dragged and dropped one of graphical icons, geometric constraint manager 108 determines if the "drop zone" is an empty area or another geometry piece. If the "drop zone" is an empty area, geometric constraint manager 108 causes other functional blocks of design engine 104 to delete the geometric constraint, and refresh the graphical icons displayed, step 306. On the other hand, if the "drop zone" is another geometry piece, geometric constraint manager 108 causes other functional blocks of design engine 104 to delete the "old" geometric constraint, and establish a "new" geometric constraint with the geometry piece in the "drop zone", step 308. Similarly, the manner in which the other functional blocks effectuate the deletion of the "old" constraint and establishment of the "new" constraint is application dependent, and may be implemented also in any one of a number of manners known in the art.

Figure 6A:
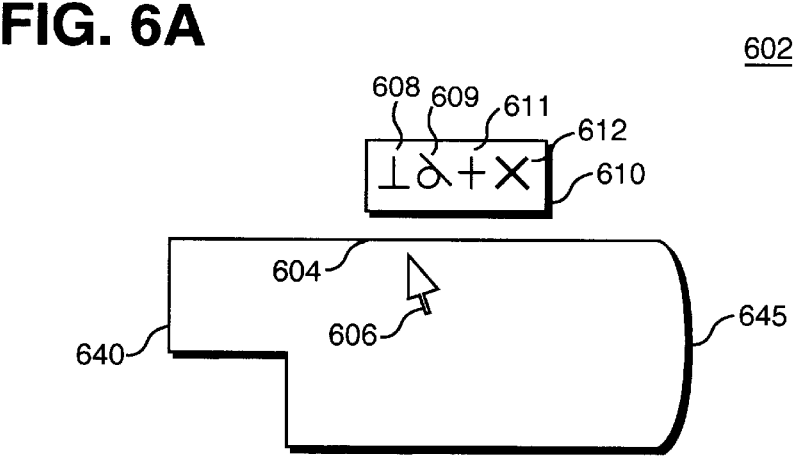
FIGS. 6a–6g illustrate a fourth aspect of the present invention for systematically viewing geometric constraints associated with a group of geometry of a mechanical design by a designer in accordance to one embodiment.

FIGS. 6a–6g illustrate a fourth aspect of the present invention for systematically viewing geometric constraints associated with a group of geometries of a mechanical design by a designer in accordance to one embodiment. As shown in FIG. 6a, as described earlier, geometric constraint manager 108 (shown in FIG. 1) operates to automatically cause graphical icons 608 and 609, representing geometric constraints associated with geometry piece 604 of mechanical design 602, to be displayed, when cursor 606 is located within a predetermined proximity of geometry piece 604. As described earlier, graphical icons 608 and 609 are caused to be displayed within framed area 610. However, in the illustrated embodiment, graphical icons 611 and 612 representing expansion and hiding of the displays to view the geometric constraints of associated geometry are additionally displayed within framed area 610.

Figure 6B:
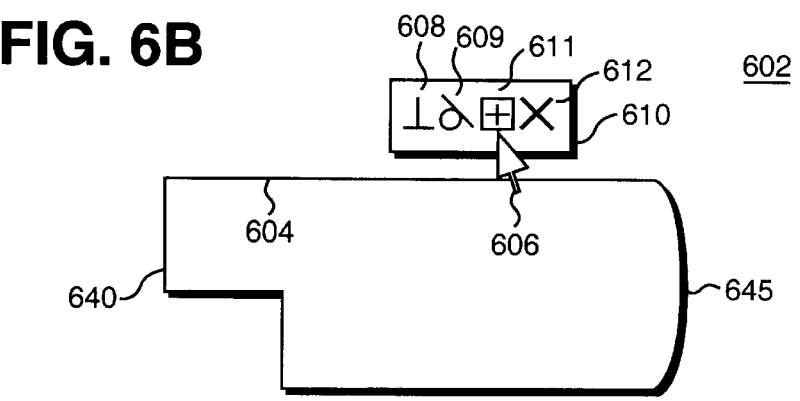
Figure 6C:
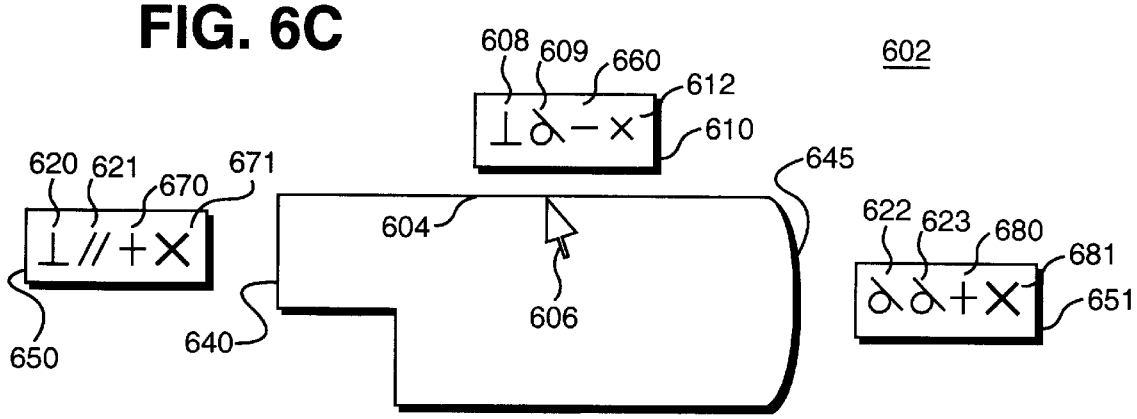

As illustrated in FIG. 6b, expansion icon 611 enables a designer to use cursor 606 (by selecting expansion icon 611) to cause geometric constraints graphical icons 620–623 of other geometry pieces 640 and 645 associated with the selected piece of geometry 604 to be displayed and viewed as shown in FIG. 6c.

In the illustrated embodiment shown in FIG. 6c, the geometric constraint graphical icons 620–623 of associated geometry pieces 640 and 645 are caused to be displayed within framed areas 650 and 651 with each framed area 650 and 651 representing the geometric constraint information of the geometry pieces 640 and 645 associated with the selected geometry piece 604. In the illustrated embodiment, the framed area displays 610, 650, and 651 are shown next to the geometry represented by the framed areas, however, it should be appreciated that the framed areas can be displayed in any manner known in the art including but not limited to tiling or any other manner of displaying framed areas. Additionally, in the illustrated embodiment, the graphical icons 608, 609, and 620–623, of associated geometry pieces 604, 640, and 645 representing all of the geometric constraint information of the geometry pieces 604, 640, and 645 are shown, however, it should be appreciated that the framed areas 610, 650, and 651 can be filtered to only display graphical icons representative of desired geometric constraints, for example, tangent constraints only. The filtering criteria may be specified in any manner known in the art. Additionally, the filtering can be performed in any manner known in the art.

As illustrated in FIG. 6c, for this embodiment, upon display of framed area displays 650 and 651, the graphical icon 611 representing expansion is changed to a graphical icon 660 representing contraction of the display to hide the framed area displays 650 and 651 representing geometric constraint information for the geometry pieces 640 and 645 associated with the selected geometry piece 604.

Figure 6D:
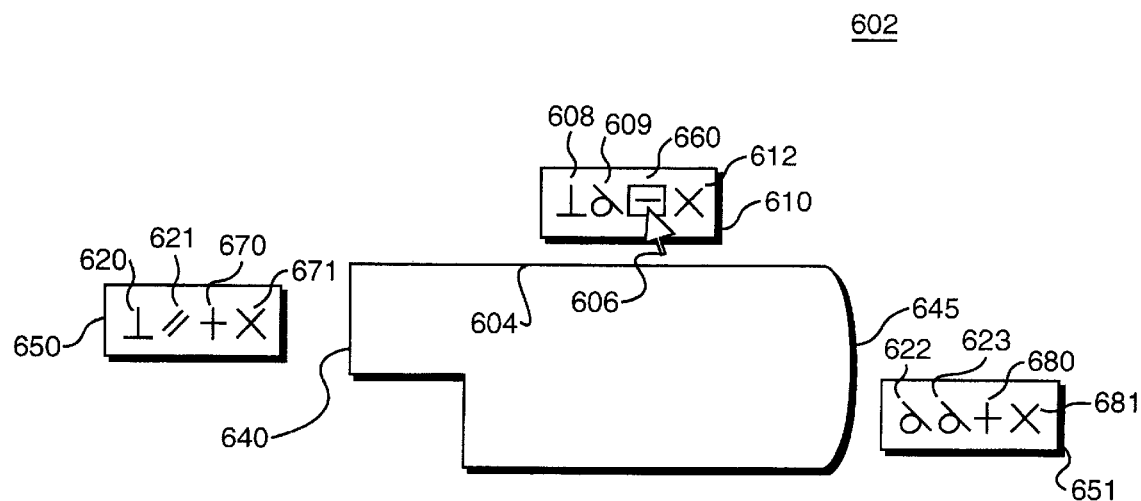
Figure 6E:
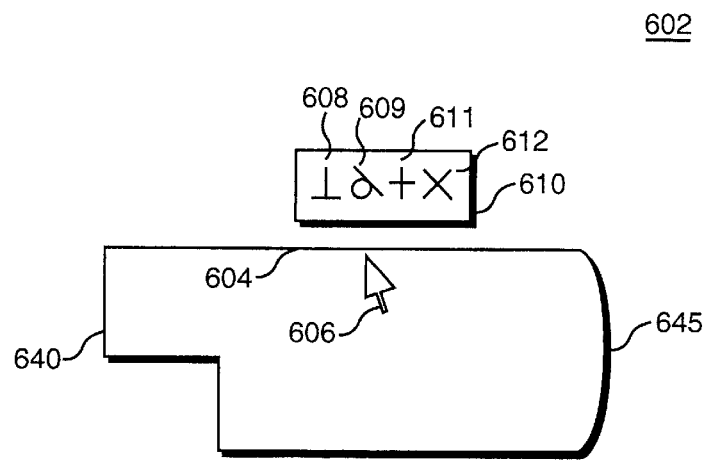

As illustrated in FIG. 6d, contraction graphical icon 660 enables a designer to use cursor 606 (by selecting contraction icon 660) to "remove" the graphical display areas 650 and 651. Thus, upon selection of contraction icon 660, the display reverts to the illustration of FIG. 6e with framed area displays 650 and 651 removed.

Figure 6F:
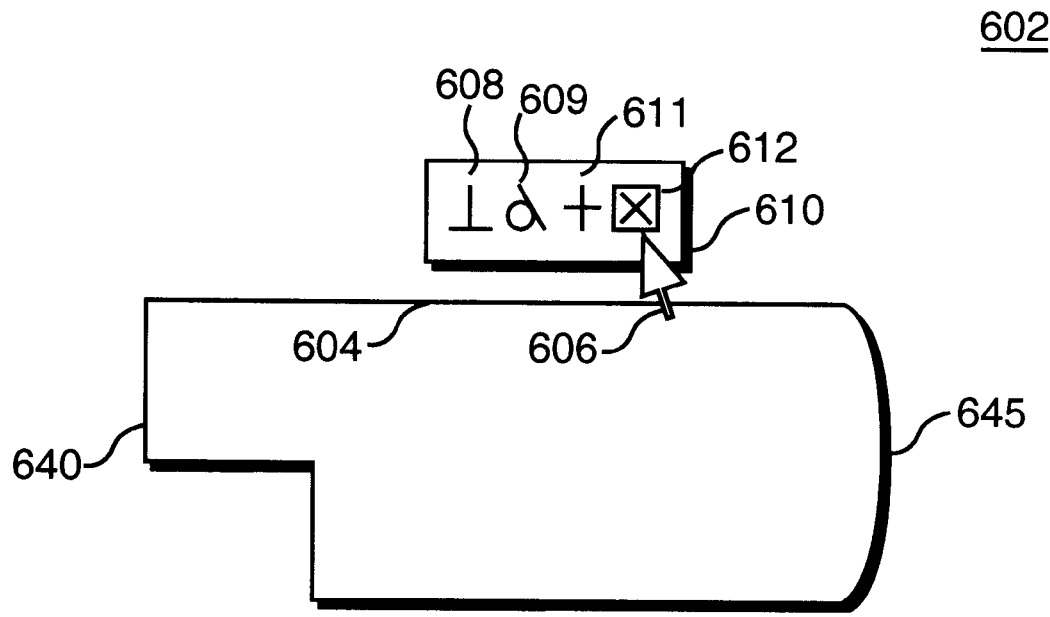

FIG. 6f illustrates employment of the graphical icon 612 to hide the graphical area 610. As illustrated, the graphical icon 612 representing hiding the graphical area 610 is selected using cursor 606. Upon selection, the graphical area 610 is removed, and therefore, the geometric constraint graphical icons 608 and 609 are no longer visible as shown in FIG. 6g.

Figure 6G:
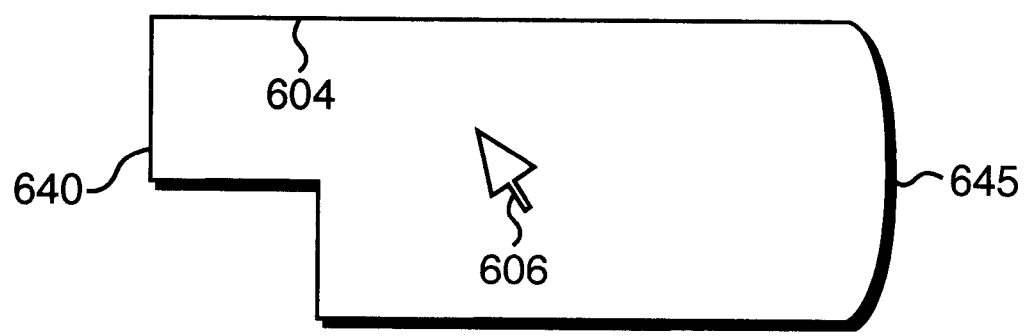

In the one illustrated embodiment, in FIG. 6g, the cursor 606 can be used to select but not limited to other geometry pieces 604, 640 or 645. As geometry pieces are selected, the geometric constraints associated with the selected geometry are viewed through graphical displays corresponding to the selected geometry.

Additionally, in the illustrated embodiment, each of the graphical display areas 610, 650, and 651 can have the graphical icons 611, 670, 671, 680, and 681 representing the expanding and hiding the geometric constraints associated with the geometry. And in turn, the graphical icons 611, 670, and 680 can be used to expand and contract the constraint displays as illustrated above.

Thus, the designer may selectively and systematically view the geometric constraints of the different geometry pieces of the mechanical design by moving the cursor around. Additionally, the designer will be able to select the number of geometric constraints viewed at any given time and select the relevant geometric constraints to be viewed.

As will be appreciated by those skilled in the art, the designer has the ability to concisely present and organize all the geometric constraints by filtering or hiding the constraint that are not of interest to the designer.

Figure 7A:
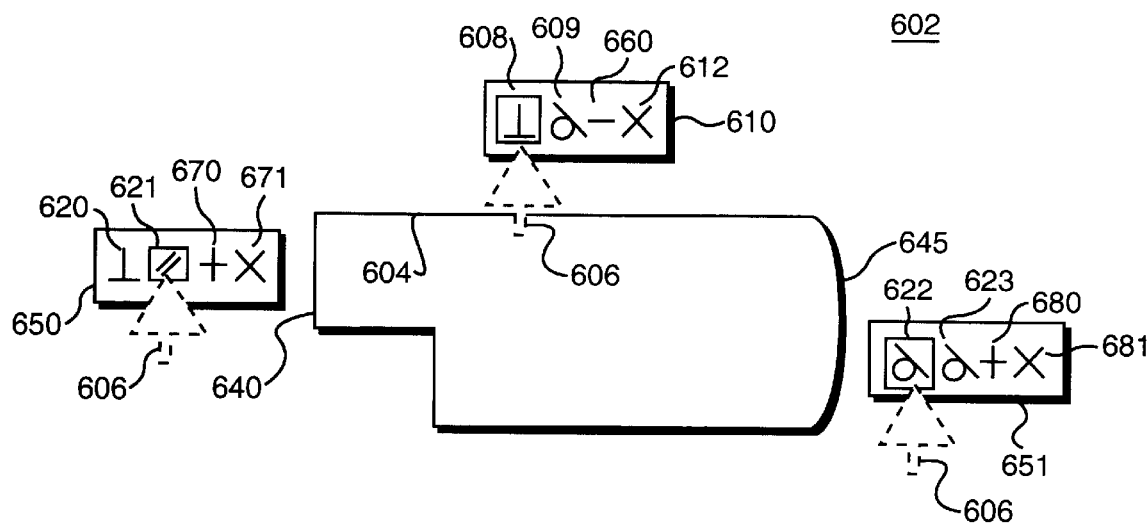
FIGS. 7a–7c illustrate a fifth aspect of the present invention for manipulating multiple geometric constraints associated with a group of geometry of a mechanical design by a designer in accordance to one embodiment.
Figure 7B:
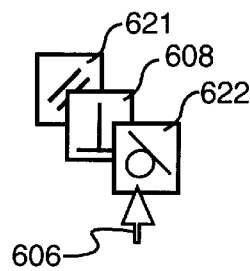
Figure 7C:
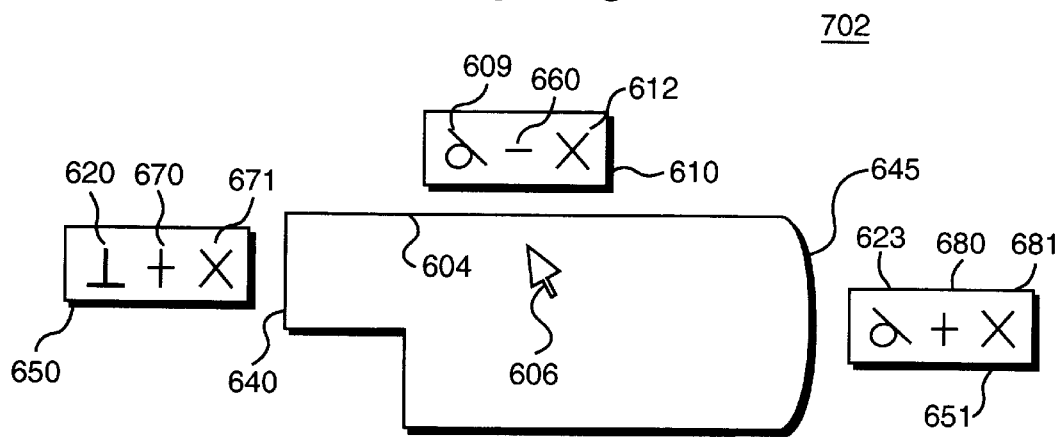

FIGS. 7a–7c illustrate a fifth aspect of the present invention for manipulting multiple geometric constraints associated with a group of geometries of a mechanical design by a designer in accordance to one embodiment.

FIG. 7a illustrates the expanded display showing the geometric constraint graphical icons 620, 621, 622, and 623 of the geometry pieces 640 and 645 associated with selected geometry piece 604 similar to FIG. 6c shown earlier. However, in the illustrated embodiment, a multiple of geometric constraint graphical icons 608, 621, and 622 are selected for manipulation. As illustrated in FIG. 7a, cursor 606 is used to select multiple geometric constraint graphical icons 608, 621, and 622 at one time, which are dragged to an empty area as shown in FIG. 7b. As illustrated in FIG. 7b, multiple geometric constraint icons 608, 621, and 622 are dragged and dropped in an empty area by use of the cursor 606 thereby deleting the selected geometric constraints of geometry 604, 640, and 645.

FIG. 7c illustrates the result of the drag and drop manipulation shown in FIGS. 7a–7b. In the illustrated embodiment, the resulting mechanical design 702 has geometric constraint graphical icons 609, 620, and 623. Multiple geometric constraints 608, 621, and 622 are no longer associated with geometry 604, 640, and 645, and therefore, removed from the mechanical design 602.

In the illustrated embodiment, the cursor 606 is used to select multiple geometric constraint icons 621, 608, and 622. However, it should be appreciated that the selection process can be of any number of graphical icons. Additionally, in the illustrated embodiment, the geometric constraint icons 621, 608, and 622 are dragged and dropped into an empty area resulting in deletion of geometric constraints as described earlier. However, it should be appreciated that multiple geometric constraint icons can be manipulated for other purposes including but not limited to placing multiple geometric constraints on geometry other than originating geometry resulting in the incorporation of the geometric constraints into the geometry piece or geometry pieces the geometric constraints were dropped into.

Thus, at any given time, the designer may selectively manipulate multiple geometric constraints of different geometry pieces of the mechanical design by selecting multiple graphical icons representing the geometric constraints desired for manipulation.

FIGS. 8a–8e illustrate the relevant operational flows of one embodiment of geometric constraint manager 108 of FIG. 1. As previously illustrated, geometric constraint manager 108 is programmed in an event driven model, i.e. geometric constraint manager 108 is designed to be executed in a system environment where various event notification services are available from the operating system. One example of such operating system suitable for practicing the present invention is the Windows® operating systems, available from Microsoft Corporation of Redmond, Wash. In alternate embodiments, geometric constraint manager 108 may be implemented in other programming approaches known in the art.

As shown in FIG. 8a, as previously described, responsive to an event notification informing geometric constraint manager 108 of the fact that the user has selected a geometry by moving the cursor within the predetermined proximity of a geometric piece of the displayed mechanical design, geometric constraint manager 108 causes other functional blocks of design engine 104 to display the graphical icons representative of the geometric constraints associated with the geometry piece. However, in the illustrated embodiment, an icon for expansion of the display is additionally displayed, step 800. The manner in which the other functional blocks effectuate the display is application dependent, and may be implemented in any one of a number of manners known in the art.

As shown in FIG. 8b, responsive to an event notification informing geometric constraint manager 108 of the fact that the user has cursor "clicked" on the graphical icon for expansion of the display, geometric constraint manager 108 causes other functional blocks of design engine 104 to "popup" related framed display areas with graphical icons of geometric constraints of one or more geometry pieces associated with the selected geometry, step 801. The manner in which the other functional blocks effectuate the "popup" of related framed display areas is application dependent, and may be implemented in any one of a number of manners known in the art.

As shown in FIG. 8c, responsive to an event notification informing geometric constraint manager 108 of the fact that the user has cursor "clicked" on the graphical icon for contraction of the display, geometric constraint manager 108 causes other functional blocks of design engine 104 to "close" the related framed display areas with the graphical icons of geometric constraints of geometry pieces associated with selected geometry, step 802. Similarly, the manner in which the other functional blocks effectuate the "close" of related framed display areas is application dependent, and may be implemented in any one of a number of manners known in the art.

As shown in FIG. 8d, responsive to an event notification informing geometric constraint manager 108 of the fact that the user has selected one of the displayed graphical icons, geometric constraint manager 108 causes other functional blocks of design engine 104 to highlight the "target" geometry piece of the geometric constraint represented by the selected graphical icon, step 803. Additionally, responsive to an event notification informing geometric manager 108 of the fact that the has selected one of the displayed graphical icons, geometric constraint manager 108 additionally determines if the "control" key is applied in conjunction with selecting additional geometric constraints with the cursor 606, step 804. If the "control" key and additional cursor selection is applied, the geometric constraint manager 108 causes other functional blocks of design engine 104 to accumulate multiple selected geometric constraints and highlight geometry of the multiple geometric constraints, step 805. On the other hand, if the "control" key and additional cursor selection is not applied, the geometric constraint manager 108 causes other functional blocks of design engine 104 to highlight the single selected geometry, step 806. Similarly, the manner in which the other functional blocks effectuate the accumulation and highlighting is application dependent, and may be implemented also in any one of a number of manner known in the art.

Figure 8E:
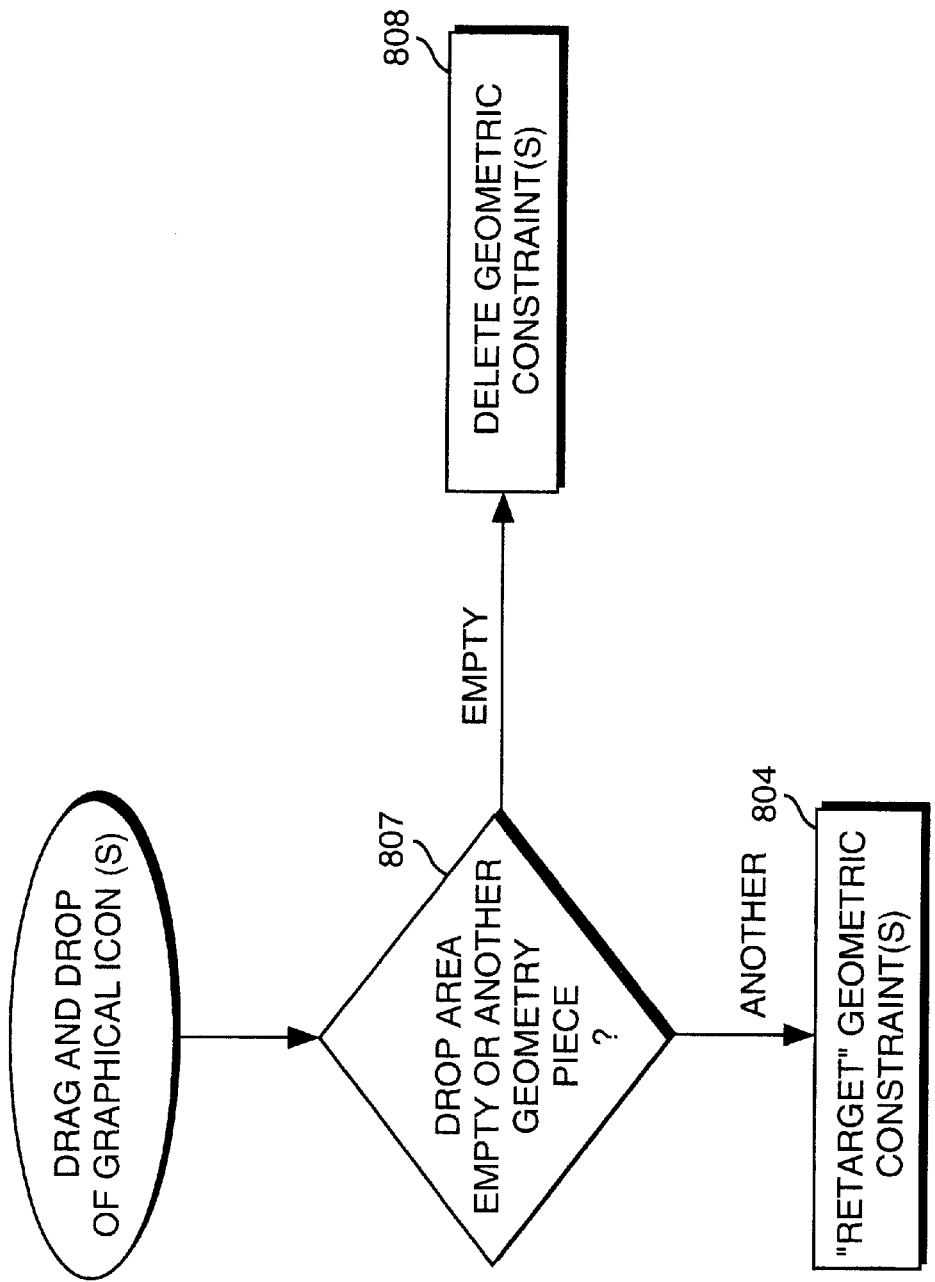

As shown in FIG. 8e, responsive to an event notification informing geometric constraint manager 108 of the fact that the user has dragged and dropped one or more of graphical icons, geometric constraint manager 108 determines if the "drop zone" is an empty area or another geometry piece. If the "drop zone" is an empty area, geometric constraint manager 108 causes other functional blocks of design engine 104 to delete one or more geometric constraints, and refresh the graphical icons displayed, step 808. On the other hand, if the "drop zone" is another geometry piece, geometric constraint manager 108 causes other functional blocks of engine 104 to incorporate one or more geometric constraints, and establish a "new set" of geometric constraints associated with the geometry piece in the "drop zone", step 809. Similarly, the manner in which the other functional blocks effectuate the incorporation of one or more geometric constraints to establish a "new set" of geometric is application dependent, and may be implemented also in any one of a number of manners known in the art.

Figure 9:
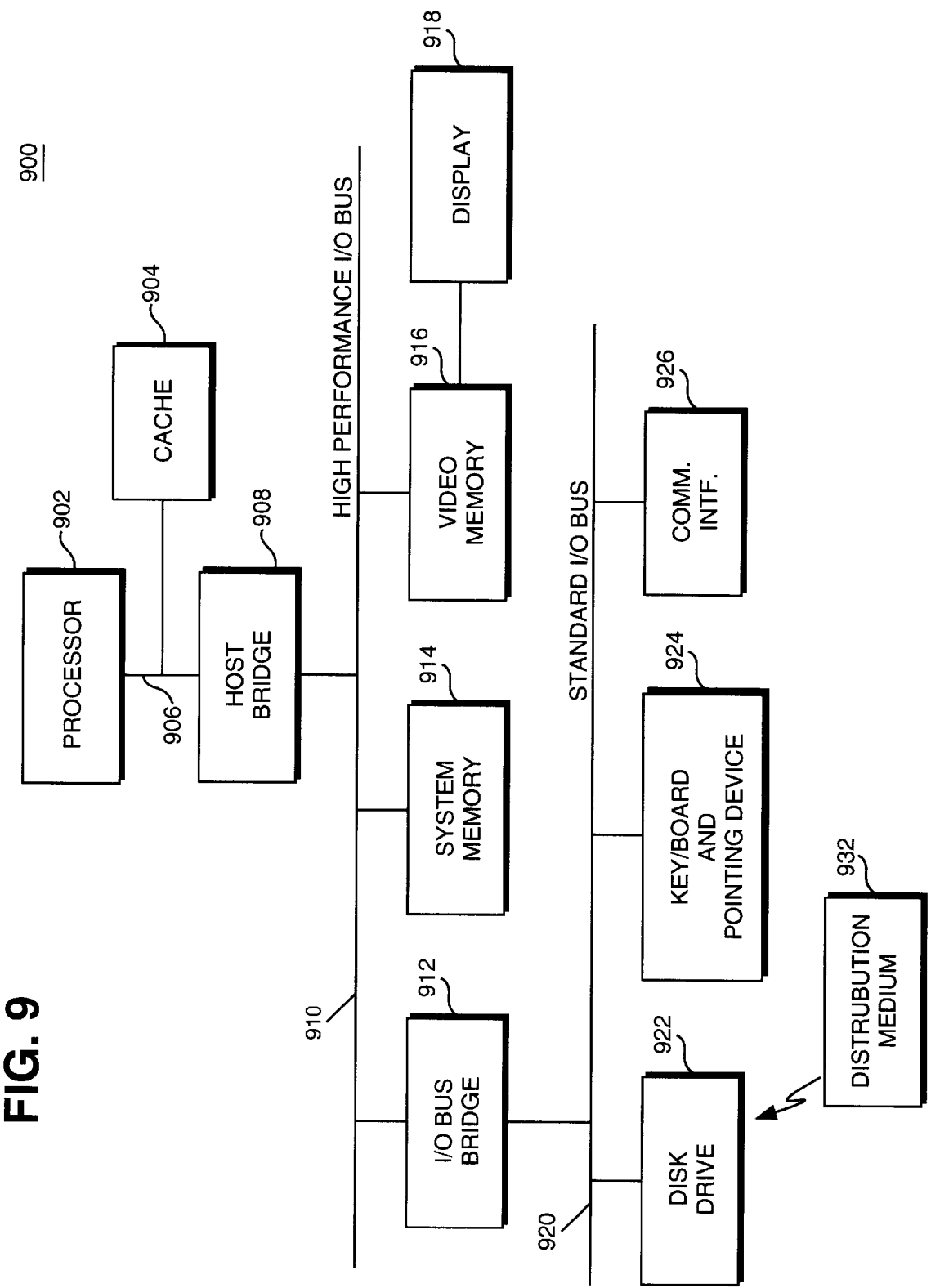
FIG. 9 illustrates one embodiment of a computer system suitable for programming with instructions that implement the present invention.

FIG. 9 illustrates one embodiment of a computer system suitable to be programmed with the mechanical design application of the present invention. As shown, for the illustrated embodiment, computer 900 includes processor 902, processor bus 906, high performance I/O bus 910 and standard I/O bus 920. Processor bus 906 and high performance I/O bus 910 are bridged by host bridge 908, whereas I/O buses 910 and 912 are bridged by I/O bus bridge 912. Coupled to processor bus 906 is cache 904. Coupled to high performance I/O bus 910 are system memory 914 and video memory 916, against which video display 918 is coupled. Coupled to standard I/O bus 920 are disk drive 922, keyboard and pointing device 924, and communication interface 926.

These elements perform their conventional functions known in the art. In particular, disk drive 922 and system memory 914 are used to store permanent and working copies of the mechanical design system. The permanent copies may be pre-loaded into disk drive 922 in factory, loaded from distribution medium 932, or down loaded from a remote distribution source (not shown). Distribution medium 932 may be a tape, a CD, a DVD or other storage medium of the like. The constitutions of these elements are known. Any one of a number of implementations of these elements known in the art may be used to form computer system 900.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a mechanical design application with improved facility for geometric constraint display and manipulation has been described.

What is claimed is:

1. A method comprising:
   (a) determining if a cursor is within a predetermined proximity of a first piece of geometry of a mechanical design; and
   (b) automatically facilitating a user in manipulating, at one time, multiple geometric constraints, associated with the first piece of geometry, upon determination that the cursor is within a predetermined proximity of the first piece of geometry.

2. The method of claim 1, wherein (b) comprises (i) automatically displaying a first number of graphical icons representative of one or more geometric constraints associated with the first piece of geometry whenever the cursor is placed within the predetermined proximity of the first piece of geometry of the mechanical design.

3. The method of claim 2, wherein (b)(i) comprises displaying the first graphical icons within a framed area.

4. The method of claim 2, wherein (b) further comprises:
   (ii) determining if the cursor is used to select a graphical icon representative of expanding the display; and
   (iii) automatically displaying a second number of graphical icons representative of one or more geometric constraints of one or more geometry pieces associated with the first piece of geometry.

5. The method of claim 4, wherein (b)(iii) comprises displaying the second number of graphical icons within one or more framed areas.

6. The method of claim 4, wherein (b) further comprises:
   (iii) determining if a user has selected at least one of the first and the second number of displayed graphical icons representative of one or more geometric constraints; and
   (iv) enabling the user to drag and manipulate at least one of the first and the second number of displayed graphical icons representative of one or more geometric constraints.

7. The method of claim 4, wherein (b) further comprises:
   (iii) determining if a user has selected a plurality of the first and the second number of displayed graphical icons representative of one or more geometric constraints; and
   (iv) enabling the user to drag and manipulate the plurality of the first and the second number of displayed graphical icons representative of one or more geometric constraints at one time.

8. A storage medium having stored therein a plurality of instructions that are machine executable, wherein when executed, the executing instructions operate to automatically facilitate a user in manipulating, at one time, multiple geometric constraints associated with one or more pieces of geometry of a mechanical design responsive to a location of a cursor within a predetermined proximity of a first piece of geometry.

9. The storage medium of claim 8, wherein the executing instructions operate to automatically display a first number of graphical icons representative of one or more geometric constraints associated with the first piece of geometry whenever the cursor is placed within the predetermined proximity of the first piece of geometry of the mechanical design.

10. The storage medium of claim 9, wherein the executing instructions further operate to display the first graphical icons within a framed area.

11. The storage medium of claim 9, wherein the executing instructions further operate to automatically display a second number of graphical icons representative of one or more geometric constraints of one or more geometry pieces associated with the first piece of geometry responsive to the user selecting a graphical icon representative of expanding the display.

12. The storage medium of claim 11, wherein the executing instructions further operate to display the second number of graphical icons within one or more framed areas.

13. The storage medium of claim 11, wherein the executing instructions further operate to enable a user to drag and manipulate at least one of the first and the second number of displayed graphical icons representative of one or more geometric constraints responsive to the user selecting at least one of the first and the second number of displayed graphical icons.

14. The storage medium of claim 11, wherein the executing instructions further operate to enable a user to drag and manipulate a plurality of first and the second number of displayed graphical icons representative of one or more geometric constraints at one time responsive to the user selecting the plurality of the first and the second number of displayed graphical icons.

15. An apparatus comprising:
(a) a storage medium having therein a plurality of instructions that are machine executable, wherein when executed, the executing instructions operate to automatically facilitate a user in manipulating, at one time, multiple geometric constraints associated with one or more pieces of geometry of a mechanical design responsive to a location of a cursor within a predetermined proximity of a first piece of geometry; and
(b) a processor coupled to the storage medium to execute the instructions.

16. The apparatus of claim 15, wherein the executing instructions operate to automatically display a first number of graphical icons representative of one or more geometric constraints associated with the first piece of geometry whenever the cursor is placed within predetermined proximity of the first piece of geometry of the mechanical design.

17. The apparatus of claim 16, wherein the executing instructions further operate to display the first graphical icons within a framed area.

18. The apparatus of claim 16, wherein the executing instructions further operate to automatically display a second number of graphical icons representative of one or more geometric constraints of one or more geometry pieces associated with the first piece of geometry responsive to the user selecting a graphical icon representative of expanding the display.

19. The apparatus of claim 18, wherein the executing instructions further operate to display the second number of graphical icons within one or more framed areas.

20. The apparatus of claim 18, wherein the executing instructions further operate to enable a user to drag and manipulate at least one of the first and the second number of displayed graphical icons representative of one or more geometric constraints responsive to the user selecting at least one of the first and the second number of displayed graphical icons.

21. The apparatus of claim 18, wherein the executing instructions further operate to enable a user to drag and manipulate a plurality of first and the second number of displayed graphical icons representative of one or more geometric constraints at one time responsive to the user selecting the plurality of the first and the second number of displayed graphical icons.

* * * * *

UNITED STATES PATENT AND TRADEMARK OFFICE
CERTIFICATE OF CORRECTION

PATENT NO.    : 6,614,458 B1
DATED         : September 2, 2003
INVENTOR(S)   : Mark W. Lambert and Paul Hanau It is certified that error appears in the above-identified patent and that said Letters Patent is hereby corrected as shown below:

<u>Title page,</u>
Insert Item -- [63], Related U.S. Application Data
           Continuation-in-part of application No. 09/076,567 filed
           May 12, 1998, now Pat. No. 6,441,837. --.

<u>Column 3,</u>
Line 43, replace "As will the" with -- As will be --.

<u>Column 4,</u>
Line 57, replace "an unitary constraint is dragged and dropped" with
-- a unitary constraint is dragged and dropped --.

<u>Column 8,</u>
Line 42, replace "the fact that the has selected" with
-- the fact that the user has selected --.

Signed and Sealed this

Twenty-fifth Day of October, 2005

JON W. DUDAS
*Director of the United States Patent and Trademark Office*